United States Patent
Timko et al.

(10) Patent No.: US 8,186,371 B2
(45) Date of Patent: May 29, 2012

(54) METHOD OF ASSEMBLING A BALL VALVE

(75) Inventors: Jared S. Timko, Mentor, OH (US); Thomas A. Lippucci, Seven Hills, OH (US); Eric M. Kvarda, Mentor, OH (US); Brandon J. Fry, Chardon, OH (US); James E. Gotch, Kirtland, OH (US)

(73) Assignee: Swagelok Company, Solon, OH (US)

( * ) Notice: Subject to any disclaimer, the term of this patent is extended or adjusted under 35 U.S.C. 154(b) by 14 days.

(21) Appl. No.: 12/748,752

(22) Filed: Mar. 29, 2010

(65) Prior Publication Data
US 2010/0200078 A1 Aug. 12, 2010

Related U.S. Application Data

(62) Division of application No. 11/247,353, filed on Oct. 11, 2005, now abandoned, and a division of application No. 10/526,738, filed as application No. PCT/US03/01351 on Jan. 17, 2003, now Pat. No. 7,887,024.

(60) Provisional application No. 60/349,629, filed on Jan. 18, 2002.

(51) Int. Cl.
*F16K 5/06* (2006.01)

(52) U.S. Cl. ........... 137/15.22; 251/315.08; 251/315.12; 251/317

(58) Field of Classification Search ........ 251/315.01–315.16, 314, 316–317.01; 137/15.22
See application file for complete search history.

(56) References Cited

U.S. PATENT DOCUMENTS

| | | | |
|---|---|---|---|
| 2,029,438 | A | 2/1936 | Nordstrom |
| 2,032,316 | A | 2/1936 | Cotton |
| 2,045,113 | A | 6/1936 | Ward |
| 2,069,013 | A | 1/1937 | Nordstrom |
| 2,144,933 | A | 4/1938 | Nielson |
| 2,177,873 | A | 10/1939 | Nordstrom |
| 2,206,370 | A | 7/1940 | Scherer |
| 2,289,722 | A | 7/1942 | Mueller et al. |
| 2,885,179 | A | 5/1959 | Werner |
| 3,038,489 | A | 6/1962 | Allen |

(Continued)

FOREIGN PATENT DOCUMENTS

DE 1202596 10/1965

(Continued)

OTHER PUBLICATIONS

International Search Report and Written Opinion from PCT/US03/01351 dated May 14, 2003.

(Continued)

*Primary Examiner* — John Bastianelli
(74) *Attorney, Agent, or Firm* — Calfee, Halter & Griswold LLP

(57) ABSTRACT

A ball valve includes a valve element and a single piece packing that seals the valve element within a valve cavity. The single piece packing is installed over the valve element at room temperature or may be molded thereon. The valve element may include a flow control element such as a ball and upper and lower trunnions. The various dimensions of the valve element and packing are selected to facilitate room temperature assembly and to substantially reduce the volume of packing material, thereby improving the performance of the valve over wider temperature ranges and pressure ratings.

19 Claims, 6 Drawing Sheets

U.S. PATENT DOCUMENTS

| | | | |
|---|---|---|---|
| 3,069,909 A | 12/1962 | Reed | |
| 3,108,779 A | 10/1963 | Anderson | |
| 3,168,900 A | 2/1965 | Hansen | |
| 3,192,943 A | 7/1965 | Moen | |
| 3,314,135 A | 10/1965 | Ludwig | |
| 3,223,111 A | 12/1965 | Anderson | |
| 3,236,495 A | 2/1966 | Buchholz | |
| 3,276,740 A | 10/1966 | Clark | |
| 3,369,791 A * | 2/1968 | Ahrens et al. | 251/307 |
| 3,552,717 A | 1/1971 | Oliver | |
| 3,575,379 A | 4/1971 | Hoos | |
| 3,576,309 A | 4/1971 | Zawacki | |
| 3,584,641 A * | 6/1971 | Milleville et al. | 251/315.02 |
| 3,589,675 A | 6/1971 | Scaramucci | |
| 3,599,932 A | 8/1971 | Scaramucci | |
| 3,601,363 A | 8/1971 | Mueller et al. | |
| 3,647,178 A | 3/1972 | Adams | |
| 3,647,179 A | 3/1972 | Scaramucci et al. | |
| 3,648,723 A | 3/1972 | Nelson et al. | |
| 3,685,793 A | 8/1972 | Szumilas et al. | |
| 3,705,707 A | 12/1972 | Scaramucci | |
| 3,735,957 A | 5/1973 | Duggar, Jr. | |
| 3,760,836 A | 9/1973 | Albanese | |
| 3,779,513 A | 12/1973 | Levine | |
| 3,780,985 A | 12/1973 | Perry | |
| 3,782,686 A | 1/1974 | Cowie | |
| 3,792,835 A | 2/1974 | Shafer | |
| 3,795,385 A | 3/1974 | Westenrieder et al. | |
| 3,815,870 A | 6/1974 | Milleville et al. | |
| 3,869,108 A | 3/1975 | Graham | |
| 3,883,112 A | 5/1975 | Milleville et al. | |
| 3,916,943 A | 11/1975 | Hester et al. | |
| 3,931,954 A | 1/1976 | Guzzetta | |
| 3,934,606 A | 1/1976 | Matthews | |
| 3,974,869 A | 8/1976 | Abe et al. | |
| 4,085,770 A | 4/1978 | Woronowicz | |
| 4,099,543 A | 7/1978 | Mong | |
| 4,108,196 A | 8/1978 | Calvert et al. | |
| 4,126,295 A | 11/1978 | Natalizia | |
| 4,147,326 A | 4/1979 | Natalizia | |
| 4,192,483 A | 3/1980 | Combes | |
| 4,254,793 A * | 3/1981 | Scaramucci | 251/315.08 |
| 4,262,688 A | 4/1981 | Bialkowski | |
| 4,286,614 A * | 9/1981 | Kacal et al. | 251/315.08 |
| 4,293,038 A | 10/1981 | Evans | |
| 4,318,420 A | 3/1982 | Calvert | |
| 4,319,664 A | 3/1982 | Price et al. | |
| 4,339,112 A | 7/1982 | Connolly et al. | |
| 4,388,945 A | 6/1983 | Johnson et al. | |
| 4,390,039 A | 6/1983 | Johnson et al. | |
| 4,410,003 A | 10/1983 | Sandling | |
| 4,423,749 A | 1/1984 | Schmitt | |
| 4,441,524 A | 4/1984 | Mese | |
| 4,475,713 A | 10/1984 | Reed et al. | |
| 4,479,513 A | 10/1984 | Koch et al. | |
| 4,483,511 A | 11/1984 | Kushida et al. | |
| 4,505,294 A | 3/1985 | Walter | |
| 4,506,696 A | 3/1985 | von Pechmann | |
| 4,519,414 A | 5/1985 | Anaya | |
| 4,535,970 A | 8/1985 | MacAfee | |
| 4,538,790 A | 9/1985 | Williams et al. | |
| 4,548,384 A | 10/1985 | Harding | |
| 4,566,482 A | 1/1986 | Stunkrad | |
| 4,572,231 A | 2/1986 | Katayama | |
| 4,572,239 A | 2/1986 | Koch et al. | |
| 4,573,498 A | 3/1986 | Ludwig | |
| 4,576,234 A | 3/1986 | Upchurch | |
| 4,579,316 A | 4/1986 | Velan | |
| 4,601,308 A | 7/1986 | Stone et al. | |
| 4,606,368 A | 8/1986 | McCafferty | |
| 4,617,957 A | 10/1986 | Sandling | |
| 4,632,140 A | 12/1986 | Harding | |
| 4,637,421 A | 1/1987 | Stunkard | |
| 4,641,681 A | 2/1987 | Ikematsu et al. | |
| 4,657,222 A | 4/1987 | Tullio | |
| 4,658,978 A | 4/1987 | ikimatsu et al. | |
| 4,662,394 A | 5/1987 | Williams | |
| 4,683,906 A | 8/1987 | Butler et al. | |
| 4,685,488 A | 8/1987 | Corbin et al. | |
| 4,696,323 A | 9/1987 | Iff | |
| 4,709,902 A | 12/1987 | Hansen | |
| 4,759,530 A | 7/1988 | Iff | |
| 4,815,701 A | 3/1989 | Stone | |
| 4,911,408 A | 3/1990 | Kemp | |
| 4,917,354 A | 4/1990 | Chambers | |
| 5,056,758 A | 10/1991 | Bramblet | |
| 5,117,858 A | 6/1992 | Osthues et al. | |
| 5,129,417 A | 7/1992 | Cupont et al. | |
| 5,181,691 A | 1/1993 | Taniguchi et al. | |
| 5,193,573 A | 3/1993 | Chronister | |
| 5,205,536 A | 4/1993 | Holec | |
| 5,215,286 A | 6/1993 | Kolenc | |
| 5,313,976 A | 5/1994 | Beasley | |
| 5,326,074 A | 7/1994 | Spock, Jr. et al. | |
| 5,419,532 A | 5/1995 | Fan | |
| 5,482,253 A | 1/1996 | Klyde | |
| 5,551,479 A | 9/1996 | Graves | |
| 5,562,116 A | 10/1996 | Henwood | |
| 5,595,206 A | 1/1997 | Soria Vega | |
| 5,685,338 A | 11/1997 | Trunk | |
| 5,707,042 A | 1/1998 | Maselli et al. | |
| 5,730,420 A | 3/1998 | Tow | |
| 5,779,222 A | 7/1998 | Hollingworth et al. | |
| 5,868,378 A | 2/1999 | McMahon et al. | |
| 5,927,687 A | 7/1999 | Krause | |
| 5,954,088 A | 9/1999 | Huang | |
| 6,161,569 A | 12/2000 | Gonsior | |
| 6,511,004 B2 | 1/2003 | Landschoot et al. | |

FOREIGN PATENT DOCUMENTS

| | | |
|---|---|---|
| DE | 4415284 | 11/1995 |
| GB | 867610 | 5/1961 |
| JP | 06-123338 | 8/1994 |
| JP | 09-178004 | 7/1997 |
| WO | 03/062683 | 7/2003 |

OTHER PUBLICATIONS

International Preliminary Examination Report from PCT/US03/01351 dated Apr. 7, 2004.
Office action from U.S. Appl. No. 10/526,738 dated Jun. 9, 2006.
Response from U.S. Appl. No. 10/526,738 dated Sep. 11, 2006.
Office action from U.S. Appl. No. 10/526,738 dated Dec. 4, 2006.
Response from U.S. Appl. No. 10/526,738 dated Feb. 5, 2007.
Advisory action from U.S. Appl. No. 10/526,738 dated Feb. 22, 2007.
Response from U.S. Appl. No. 10/526,738 dated Mar. 29, 2007.
Office action from U.S. Appl. No. 10/526,738 dated Jun. 25, 2007.
Response from U.S. Appl. No. 10/526,738 dated Oct. 16, 2007.
Office action from U.S. Appl. No. 10/526,738 dated Dec. 28, 2007.
Pre-Appeal Brief Request, Reasons for Submitting Pre-Appeal Brief Request and Notice of Appeal from U.S. Appl. No. 10/526,738 dated Apr. 28, 2008.
Notice of Panel Decision from Pre-Appeal Brief Review from U.S. Appl. No. 10/526,738 dated Jun. 12, 2008.
Response from U.S. Appl. No. 10/526,738 dated Oct. 10, 2008.
Office action from U.S. Appl. No. 10/526,738 dated Dec. 29, 2008.
Response from U.S. Appl. No. 10/526,738 dated Mar. 30, 2009.
Office action from U.S. Appl. No. 10/526,738 dated Nov. 27, 2009.
Response to Office action from U.S. Appl. No. 10/526,738 dated Mar. 29, 2010.
Office action from U.S. Appl. No. 11/247,353 dated Jun. 9, 2006.
Interview Summary from U.S. Appl. No. 11/247,353 dated Sep. 19, 2006.
Response to Office action from U.S. Appl. No. 11/247,353 dated Oct. 9, 2006.
Supplemental Response to Office action from U.S. Appl. No. 11/247,353 dated Oct. 16, 2006.
Office action from U.S. Appl. No. 11/247,353 dated May 16, 2007.
Response from U.S. Appl. No. 11/247,353 dated Oct. 16, 2007.
Office action from U.S. Appl. No. 11/247,353 dated Jan. 3, 2008.
Response from U.S. Appl. No. 11/247,353 dated May 5, 2008.
Office action from U.S. Appl. No. 11/247,353 dated Oct. 7, 2008.
Response from U.S. Appl. No. 11/247,353 dated Feb. 9, 2009.
Office action from U.S. Appl. No. 11/247,353 dated Apr. 27, 2009.

Response from U.S. Appl. No. 11/247,353 dated Aug. 7, 2009.
Office action from U.S. Appl. No. 11/247,353 dated Nov. 27, 2009.
Notice of Abandonment from U.S. Appl. No. 11/247,353 dated Jun. 9, 2010.
Summons to Attend Oral Hearing from EP 05025268-3-1252/ 1626213 dated Mar. 31, 2009.
Fluoroplastics, vol. 2—Melt Processible Fluoropolymers, Chapter 13 Properties of Fluoropolymers, 2003, Plastics Design Library, pp. 375-447.
Hamilton Company brochure, 1 pg., Jun. 1995, printed USA.
Homestead cam-sealed valves, The Inside Story of Homestead Cam-Sealed Plug Valves, p. 2.
Nupro brochure, Plug Valves, Catalog MS-01-59, 4 pgs., printed USA, Jan. 1999.
Swagelok brochure, 40 Series Special Flow Path, Catalog MS-02-30, 4 pgs., printed USA, Feb. 1998.
Victrex, Processing Guide, 21 pgs., copyright Vitrex USA 604/2.5M.
Whitey brochure, Rising Plug Valves, Catalog MS_01-49, 4 pgs., printed USA, Mar. 1998.
Whitey brochure, 40 Series Ball Valves, Catalog MS-01-60, 8 pgs., printed USA, Apr. 1998.
Xomox Corporation brochure, pp. 3-5 and 7, 1985.
Notice of Allowance from U.S. Appl. No. 10/526,738 dated Oct. 6, 2010.

\* cited by examiner

METHOD OF ASSEMBLING A BALL VALVE

RELATED APPLICATIONS

This application is a divisional application of U.S. Ser. No. 11/247,353 filed on Oct. 11, 2005 for METHOD OF ASSEMBLING A BALL VALVE, which is a divisional application of application Ser. No. 10/526,738, filed Mar. 4, 2005 for BALL VALVE WITH SINGLE PIECE PACKING which claims priority to International Application Serial No. PCT/US2003/01351, filed Jan. 17, 2003 for BALL VALVE WITH SINGLE PIECE PACKING which claims the benefit of U.S. Provisional patent application Ser. No. 60/349,629 filed on Jan. 18, 2002 for BALL VALVE WITH SINGLE PIECE PACKING, the entire disclosures of which are fully incorporated herein by reference.

TECHNICAL FIELD OF THE INVENTION

The subject invention relates in general to ball valves. More particularly, the invention relates to a new ball valve design and packing concepts that improve valve performance under higher and lower rated operating temperatures and thermal cycling.

BACKGROUND OF THE INVENTION

Ball valves are well known in the art, and a highly successful commercially available ball valve is described in U.S. Pat. No. 4,685,488 issued to Corbin et al. and owned by the assignee of the present invention, the entire disclosure of which is fully incorporated herein by reference.

Ball valves that use polymers for the ball packing material are usually limited in their rated or specified high and low temperature operating ranges at rated pressure. This is because the packing material expands and contracts at a different rate than other valve components which typically are made of stainless steel. At higher temperatures the packing material softens and tends to flow or creep and may become permanently deformed or otherwise damaged during valve actuation at higher temperature. This damage to the packing can result in leakage, especially when the valve returns to ambient temperature. At colder temperatures, the packing material becomes harder and stiffer and there may also, in some cases, be a decreased sealing stress on the packing due to packing shrinkage at lower temperatures. This loss of stress can produce leakage at lower temperatures. Although it is known to incorporate live load packing techniques into ball valves to increase the rated operating temperature range of the valve, the overall improvement is still limited by the temperature response characteristics of the packing material itself.

The need continues to exist for a ball valve having a polymer type ball packing material with increased rated operating temperature range and temperature cycling performance at rated pressure.

SUMMARY OF THE INVENTION

The present invention contemplates a ball valve arrangement in which a single piece packing may be installed onto a valve element within a temperature range so that the mechanical properties of the packing material are substantially unchanged. The present invention further contemplates methods of assembly. Still further the invention contemplates a valve element and packing wherein various dimensions are selected to improve the rated operating temperature range and cycle life of the valve such as by reducing the volume of packing material and providing a more uniform distribution of load on the packing after installation into the valve. Various aspects of the invention may optionally be used with a multi-piece packing. Still further, the invention contemplates a ball and trunnion design that allows a ball valve element to axially float or shift when the valve element packing expands and contracts under temperature changes. Another aspect of the invention relates to the use of a live load applied to the valve element packing in combination with the axial float of the valve element.

These and other aspects and advantages of the invention will be readily understood and more fully described in the following detailed description of various embodiments and alternatives of the invention when read in view of the accompanying drawings.

DETAILED DESCRIPTION OF THE INVENTION

Figure 1:
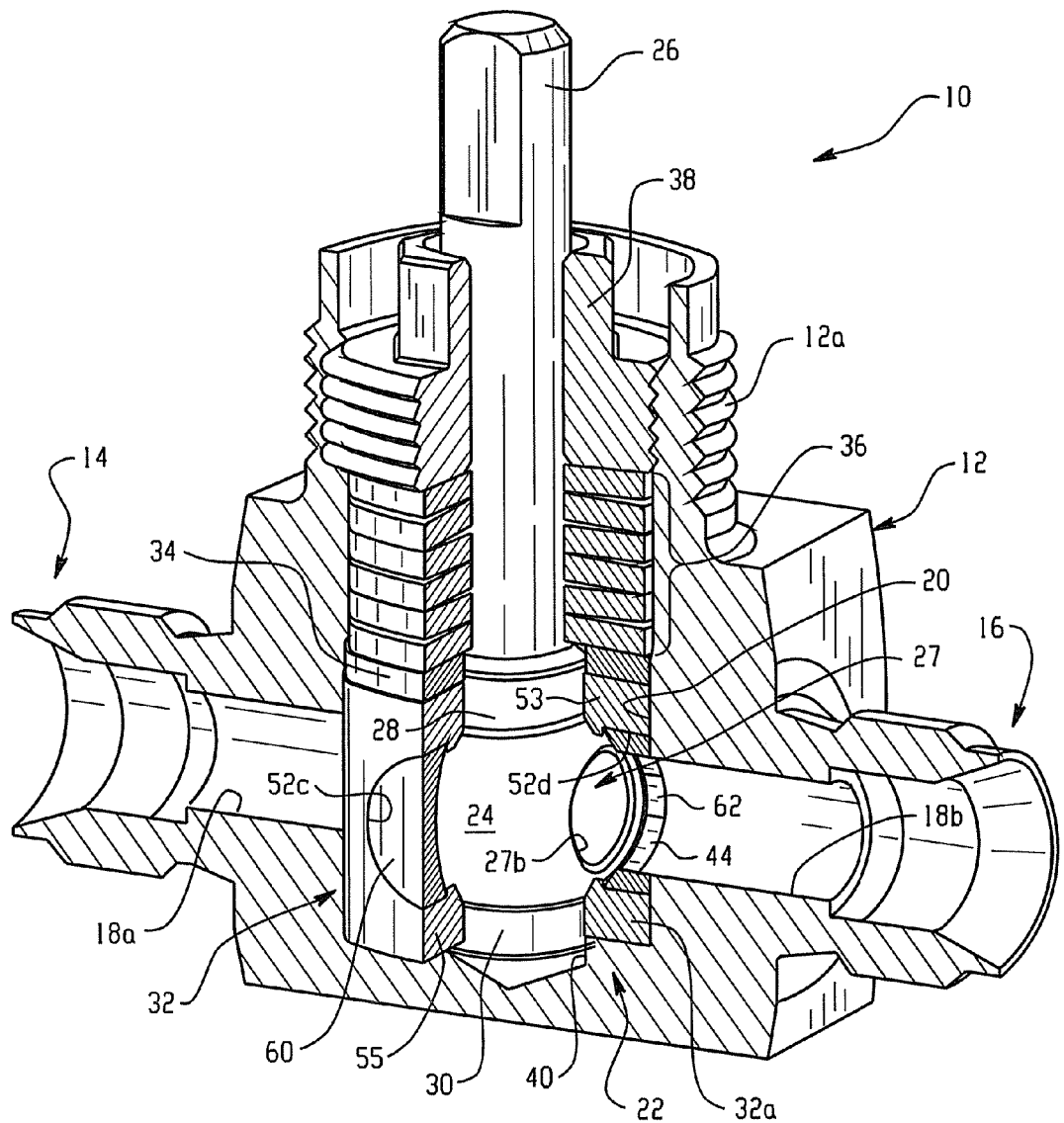
FIG. 1 is an isometric cross-section view of a ball valve incorporating various aspects of the present invention (valve illustrated in open position)
Figure 2:
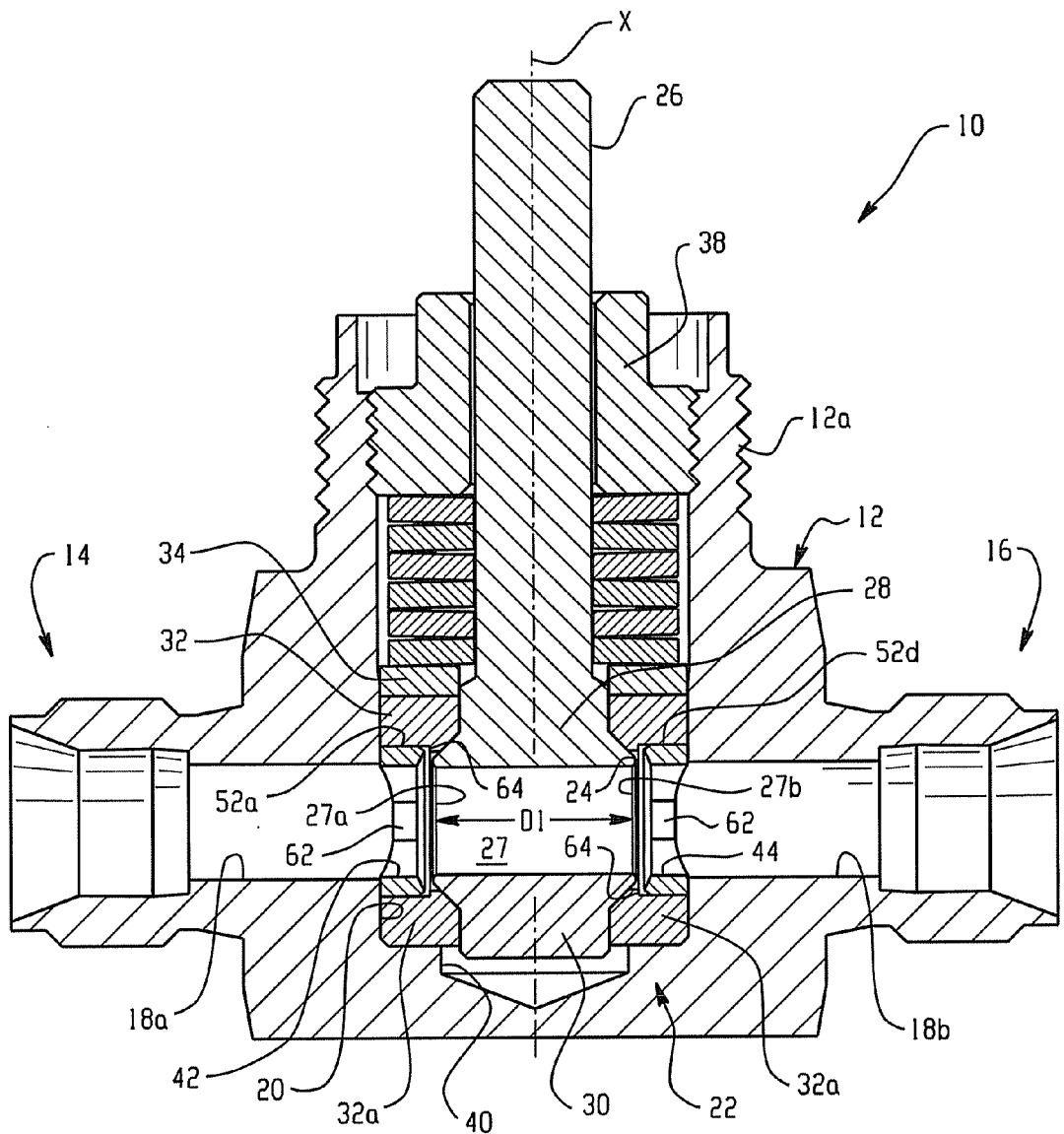
FIG. 2 is a vertical cross-section in elevation of the valve of FIG. 1.

With reference to the drawings, the present invention contemplates a ball valve design with improved temperature performance ratings at rated pressure. The improved temperature performance includes higher and lower rated or specified temperature ranges, as well as under thermal cycling. The present invention is described herein with reference to a particular ball valve design, however, those skilled in the art will readily appreciate that the various aspects of the invention may be incorporated into different ball valve configurations. Furthermore, while the exemplary embodiment herein includes several different aspects of the invention, the invention should not be construed in a limiting sense. Rather, some or all of the aspects and features of the present invention may be incorporated into a ball valve design either individually or in various combinations or sub-combinations and still be within the scope and spirit of the present invention as set forth in the appended claims. Furthermore, while various alternative embodiments may be described herein, such description is not intended to be an exhaustive list of every alternative embodiment that may be readily apparent to those skilled in the art in view of the teachings herein. The present invention contemplates alternative embodiments within the scope of the appended claims, whether expressly described herein or not. Although the exemplary embodiment illustrates a single piece or unitary packing, various aspects of the invention may also be utilized with multi-piece packings.

Various aspects of the present invention then are illustrated in the drawings as being embodied in a ball valve 10 having a valve body 12 with appropriate end fitting connections 14 and 16 for installing the valve 10 in a fluid circuit. Respective bores 18a and 18b extend from each end fitting connection 14, 16 through the valve body 12 and open to a central ball receiving valve cavity 20 formed therebetween in the valve body 12. A valve element assembly 22 is disposed partly within and extends from the valve cavity 20. The valve element assembly 22 includes a flow control ball 24 that is preferably but not necessarily machined integral with a valve actuator stem 26. The ball 24 has a central fluid passageway or bore 27 machined therethrough and forms openings or stem orifices 27*a* and 27*b* that align with the valve body bores 18*a* and 18*b* to permit fluid flow therebetween when the valve is in the open position illustrated in the drawings. When the stem 26 and ball 24 are rotated to a position such that the orifices 27*a* and 27*b* are out of alignment with the valve body bores 18*a*, 18*b*, the valve is in a closed position and fluid flow is blocked. For example, the valve 10 may be closed by a ninety degree (quarter-turn) rotation of the ball 24.

The valve stem 26 extends through an optionally externally threaded integral bonnet 12*a* of the valve body 12. The stem 26 may either include a handle (not shown) for manual actuation or may be coupled to a valve actuator (not shown) such as an electric or pneumatic or hydraulic actuator, for example. Rotation of the stem 26 about its longitudinal axis X causes rotation of the ball 24 within the valve cavity 20 to open and close the valve.

The valve stem 26 further includes an upper trunnion 28 and a lower trunnion 30. The upper and lower trunnions 28, 30 along with a valve packing 32, help to align and journal the valve element 22 within the valve cavity 20. In accordance with one aspect of the invention, at room temperature a rather close or interference fit is provided between the internal surface of the packing 32 and the outside surfaces of the ball 24 and the trunnions 28, 30. Additionally, after the valve element assembly 22 is installed and fully compressed in the valve body cavity 20, there is at room temperature an interference fit between the outer surface of the packing 32 and the surface of the cavity 20 both in the spherical portion surrounding the ball as well as the portions that receive the trunnions. These diametrical and trunnion interference fits provide for a greater and more evenly distributed sealing force or pressure between the packing 32 and the stem surfaces 24, 28 and 30 (i.e. the ball and trunnion surfaces) with less live loading required on the packing 32 as compared to prior art valves.

In accordance with one aspect of the invention, the valve packing 32 provides a fluid tight seal between the stem surfaces 24, 28 and 30 and the valve body 12. The packing 32 is stationary, in this embodiment, relative to rotation of the valve stem 26 and ball 24 during valve actuation. In its preferred but not exclusive form, and with reference to FIG. 4, the packing 32 is a single piece packing meaning that the packing is a unitary structure that is press fit assembled with the valve stem 26 to form the valve element assembly 22 prior to installing the valve element assembly 22 in the valve body 12. The packing 32 is preferably although not necessarily made of perfluoroalkoxy (PFA) material and may be made by conventional machining or molding processes. Other suitable materials for the packing 32 include but are not limited to ultra-high molecular weight polyethylene, PTFE (polytetrafluoroethylene) and variants of PTFE such as filled PTFE, polyetheretherketone (PEEK), filled PFA or fluorinated ethylene propylene. In some applications it may also be desirable to over-mold the single piece packing in place on the trunnions and ball.

Figure 6:
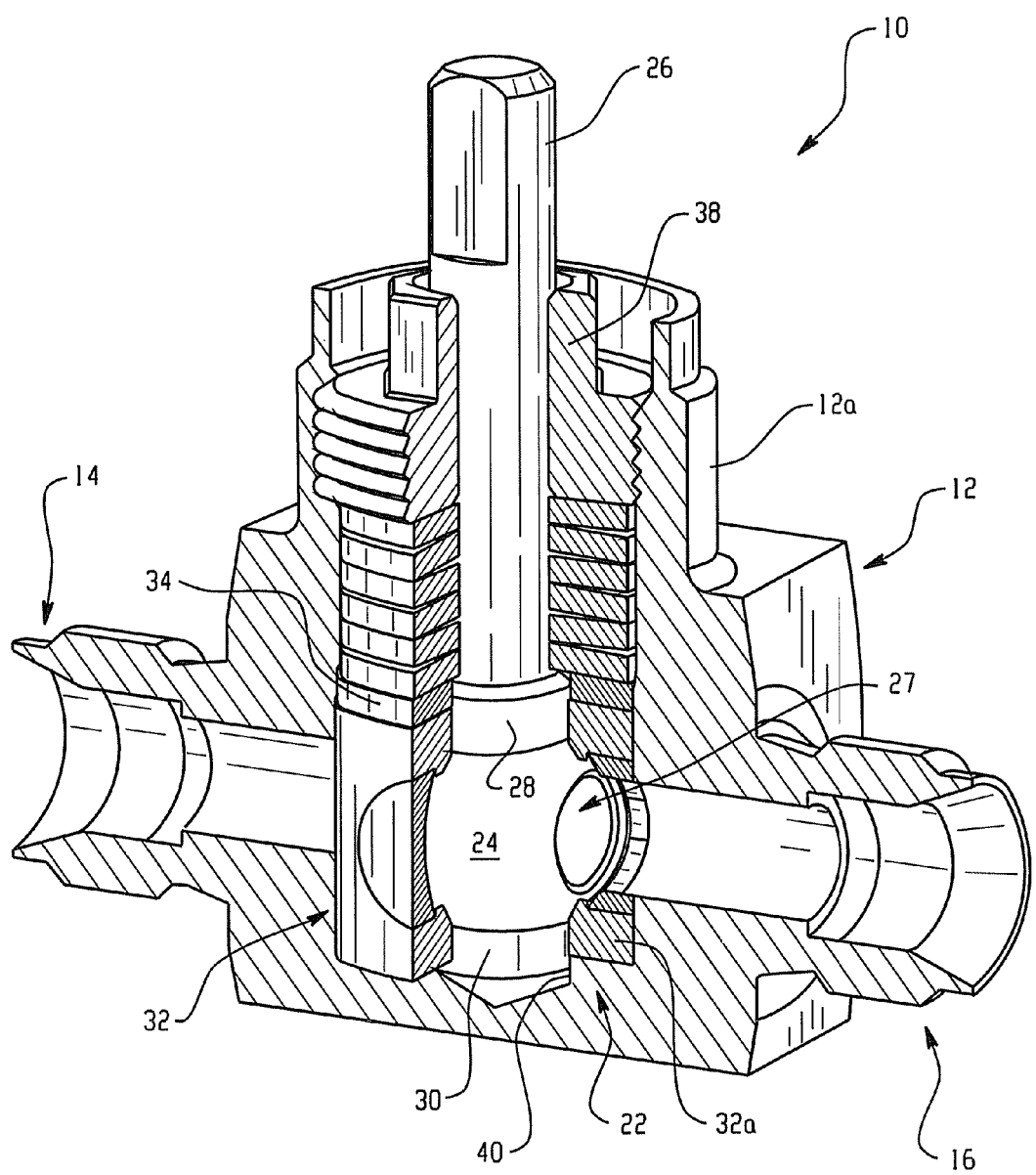
FIG. 6 is an isometric cutaway of another embodiment of the invention using a non-spherical ball valve element.

The single piece packing 32 is generally cylindrical in shape and includes a central longitudinal bore 50. This bore 50 is sized relative to the outer diameter of the ball 24 and the trunnions 28, 30 so as to have an interference fit therewith at room temperature but at the same time to be able to be snap or press fit assembled at room temperature over the ball 24 and trunnions 28, 30 using an appropriate tool. As best illustrated in FIG. 4A, the packing interior surface 51 is formed with a contour or profile that generally conforms to the stem profile, in particular the ball 24 and the trunnions 28, 30. Thus, in the embodiment wherein the valve element is a spherical ball, the interior surface 51 is generally spherical and sized to have an interference fit with the ball 24. The upper and lower portions 53 and 55 of the interior portion of the packing 32 are cylindrical to conform with and appropriately sized to have an interference fit with the upper and lower trunnions 28, 30 respectively. It should be noted however, that the valve element need not be a spherical ball as in the drawings herein, but may have other profiles such as an oval "football" shape or other profile suitable to a particular application. FIG. 6 herein illustrates an example of such a valve element profile. In such cases, the packing 32 will be made to have a generally conforming profile. Furthermore in some applications the interior surface 51 need not strictly conform to the shape or profile of the stem prior to installation of the stem into the packing, but upon final compressed assembly into the valve body will substantially conform to the stem profile so as to adequately seal the ball and trunnions.

Figure 5:
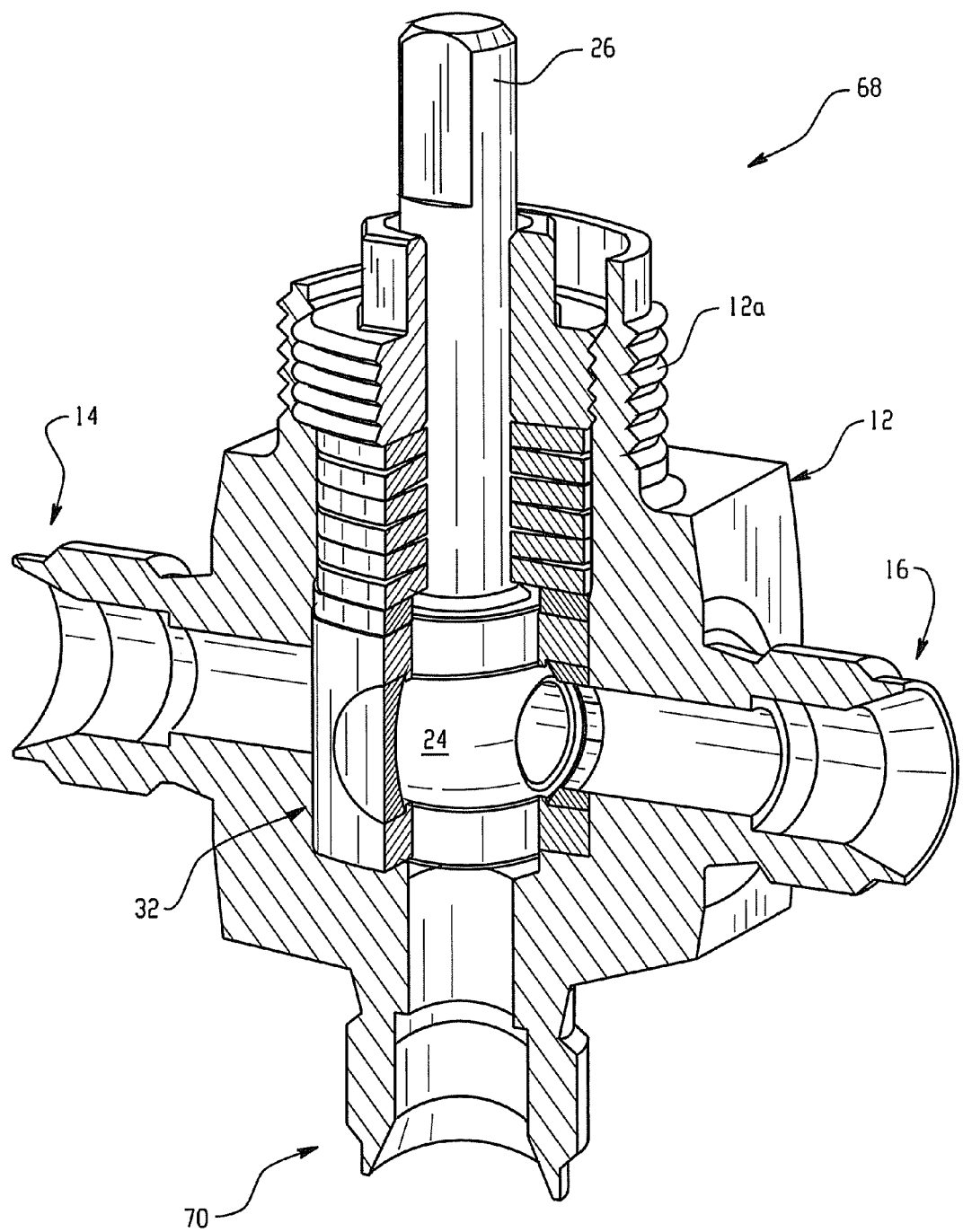
FIG. 5 is an isometric cutaway of another embodiment of the invention with a third flow port added.

The packing 32 further includes a number of openings 52*a-d* formed in the cylindrical wall 54 of the packing 32. Pairs of these openings, for example 52*a*/52*d* or 52*b*/52*c* are diametrically opposed to each other so as to concentrically align with the orifices 27*a* and 27*b* of the ball 24. In the illustrated example, openings 52*b* and 52*c* align with the passageway 27 when the valve is in the closed position and openings 52*a* and 52*d* align with the passageway 27 when the valve is in an open position. The lower port 50*a* of the bore 50 may also be used as an opening to a bottom mounted port formed in the stem 26, as illustrated in FIG. 5 and as will be described hereinafter.

For the openings that are used for fluid flow when the valve 10 is in the open position (for example, openings 52*a* and 52*d* in FIG. 4), support rings 42, 44 may be provided that are slip fit inserted into these openings. The support rings 42, 44 include through holes 42*a* and 44*a* respectively for permitting fluid flow therethrough when the valve 10 is in its open position. The support rings 42, 44 support the packing 32 in the area of the openings 52 to prevent extrusion of the packing into the passageway 27 or the ports 27*a* and 27*b*. To enhance this effect, the support rings 42, 44 may be provided with internal flats 62 that generally align with the X axis when the rings are installed in the packing. These flats increase the rigidity of the support rings to increase their support of the packing material under load.

Each of the openings 52*a-d* may include an internal circumferentially raised lip 64. This lip prevents a support ring 42, 44 from inadvertently contacting the ball 24 outer surface when the stem 26 is rotated.

Figure 4:
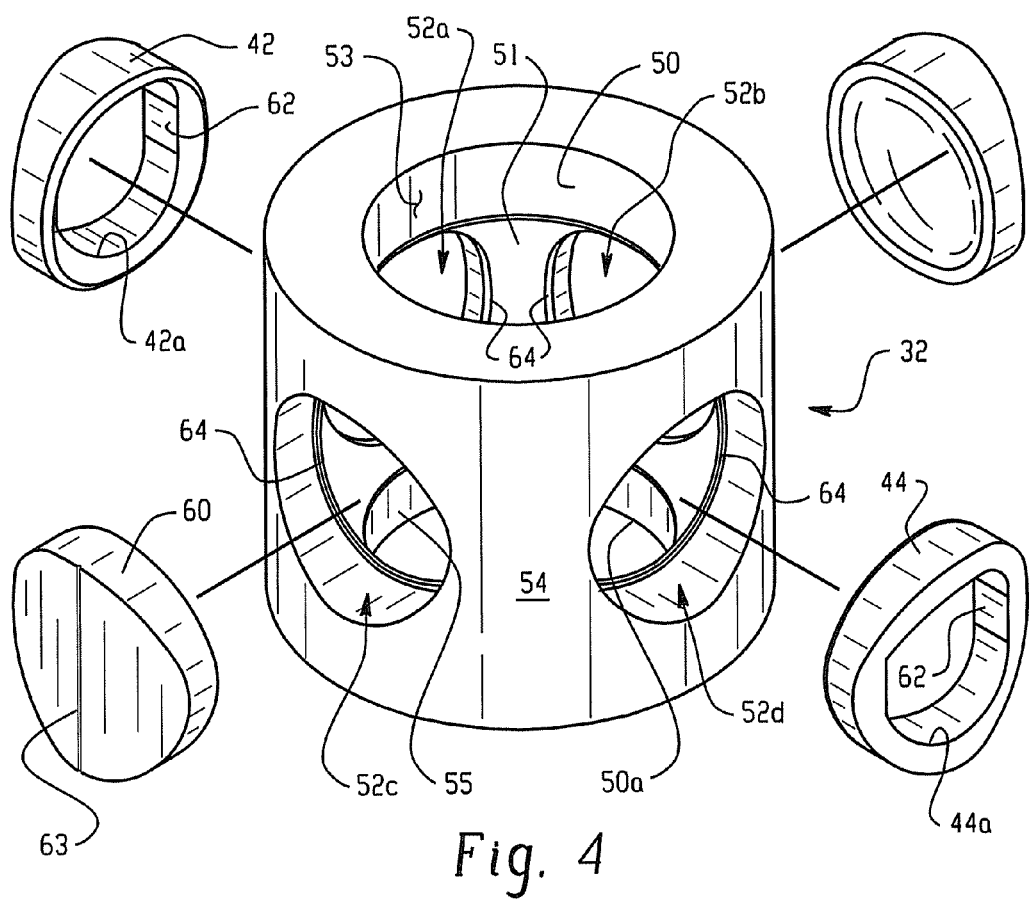
FIG. 4 is an exploded isometric of a single piece packing and support rings used in the embodiment of FIG. 1.
Figure 4A:
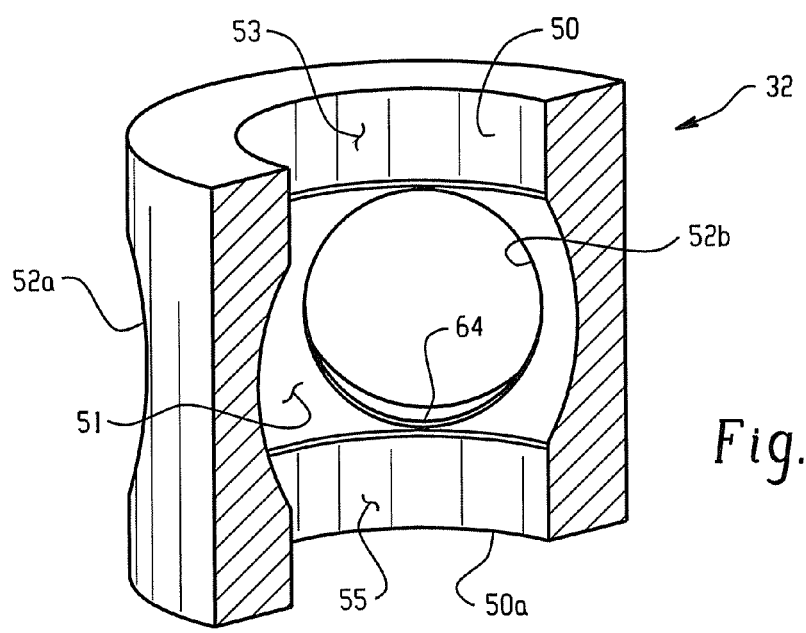
FIG. 4A is a partial cross-section of the packing of FIG. 4.

When various of the openings 52 (such as, for example, opening 52*c* or 52*b*) are not to be used for a particular valve configuration (for example, only two of the openings 52 are used for a two port valve) each such unused opening is plugged with a suitable disk or plug 60 (FIG. 4). Each disk 60 slip fits into its respective opening 52. The disks 60 support the packing 32 against cold flow extrusion and creep in the region of the passageway 27.

The disks 60 (and the support rings 42, 44) may be made of any suitable material, such as for example, stainless steel, and preferably but not necessarily are curved or otherwise shaped to conform on their outside surface to the outside profile of the packing, and on their inside surface to conform to the inside profile of the packing 32 (note in the illustrated embodiment that the packing 32 has a cylindrical outside surface profile and both a spherical portion and cylindrical portion to its inside surface profile). The disks 60 sit against the inner lip 64 in the respective opening 52 so as not to contact the ball surface.

In order to install the packing 32 onto the valve element 22 (other than for an over-molded process), the packing 32 is assembled with the integral ball and stem by press fit, snapped or otherwise slipped into place on the stem 26 over the upper or lower trunnion 28, 30 and over the outer surface or diameter of the ball 24 which necessarily is larger in diameter than either trunnion 28, 30. If the packing 32 is thus too bulky, it will be too stiff and inflexible at room temperature to slip onto the ball 24 to the position illustrated in the drawings. In accordance then with one aspect of the invention, the valve element 22 is machined so that the diameter D1 of the ball 24 is only slightly greater than either or both of the respective diameters D2, D3 of the trunnions 28, 30 (see FIG. 3). The trunnion diameters D2 and D3 may be the same or different depending on the selected valve design.

In prior art ball valves, the trunnion to ball diameter ratio (either D2/D1 or D3/D1) typically is 0.3-0.65. In accordance with the invention the ratio should be preferably about 0.7 to about 0.9 and more preferably about 0.70 to about 0.76. This substantially higher ratio (enlarged trunnion relative to the ball diameter) substantially reduces the mass volume of the packing 32 because there is less gap between the trunnions and the valve body cavity 20. The reduced mass volume of the packing 32 also allows the packing 32 to be more flexible at room temperature thus allowing the packing 32 to be snap fit or press fit onto the valve element 22 at room temperature. Since the ball 24 is only slightly larger than the trunnions 28, 30, the more flexible packing 32 can easily be installed onto the valve element 22 at room temperature prior to installing the valve element 22 into the valve body 12. This greatly simplifies assembly thus reducing assembly time and cost.

As used herein, by "room temperature" is simply meant that range of temperatures within which the packing material is not significantly changed in terms of the packing material's properties such as elasticity characteristics. An exemplary but not required range for room temperature assembly is about 65-100° F. In other terms, "room temperature" is that range of temperatures in which the packing remains substantially in its normal condition without substantially altering the mechanical properties of the packing material such as, for example, its elasticity.

It is noted at this point that an alternative process for providing a single piece packing on a valve stem/ball/trunnion element is to over-mold the packing in place. In other words, directly mold the packing onto the stem using conventional molding techniques. An over-mold process eliminates the assembly step of slipping the packing 32 into position on the stem. However, other benefits and aspects of the present invention that result in a reduction in packing mass volume may also be realized with a single piece packing that is over-molded in place.

Completing the description of the valve 10 structure, a packing gland 34 is provided axially adjacent the valve packing 32 upper surface. This packing gland 34 may be made of stainless steel for example, and functions to help contain the packing 32 at elevated temperatures and also serves as a thrust washer for live loading the packing 32. The diametric clearance between the inside diameter of the gland 34 and the outside diameter D2 of the upper trunnion 28, as well as the diametric clearance between the outside diameter of the gland 34 and the body cavity 20 diameter, are controlled so that the gland 34 contains the packing 32 thereby reducing or minimizing creep or extrusion at elevated temperatures, as well as to function as a thrust washer to load the packing 32. A number of disk springs 36 or other suitable load applying members are axially stacked (with reference to the longitudinal axis X of the stem 26) and compressed against the gland 34. The load members 36 apply a live load to the gland 34 and the packing 32 so as to maintain adequate sealing compression of the packing 32 at higher and lower temperatures. By "live load" is meant that the load members 36 continue to apply a load force against the gland 34 and the packing 32 when the valve is operated at a temperature above or below room or ambient temperature. The load members 36 are compressed and held in place by a threaded packing bolt 38 that is threadably installed in the upper or stem receiving extension 12a of the valve body 12.

The lower trunnion 30 axially extends below the bottom 32a of the packing 32 into a counterbore 40 formed in the valve body 12. Preferably there is a close clearance fit between the lower trunnion 30 and the diameter of the counterbore 40. This close clearance fit helps to contain the lower portion of the packing 32 against creep or extrusion, maintains contact stress between the packing 32 and the ball 24, and maintains contact stress between the packing 32 and the roughened surface of the valve cavity 20 (roughened, for example, by abrasion sand blasting) to prevent the packing 32 from rotating within the valve body 12 during valve actuation. The lower portion packing 32a containment reduces packing stress relaxation at non-ambient and particularly lower temperatures. The upper and lower packing containment features allow the valve element 22 to axially move to compensate for packing 32 expansion and contraction over thermal cycles.

The packing 32 openings 52a and 52d concentrically align respectively with the ball fluid passageway stem orifices 27a and 27b when the valve 10 is in the fully open position. At the orifices 27a and 27b the retaining or support rings 42, 44 and disks 60 are positioned within the packing 32 openings 52a-d and help contain the packing 32 to prevent extrusion of packing material into the ball passageway 27 and orifices 27a and 27b.

The valve is assembled as follows. The support rings 42, 44 and disks 60 when appropriate are inserted into the packing 32 openings 52a-d. The rings and disks thus also help support the packing 32 during the assembly process. The packing 32 is then installed on the valve stem 26 as described herein above. The valve element assembly 22 that includes the ball/stem 24/26, the one piece packing 32 and the support rings 42, 44 (and disks 60 when used) is installed into the valve cavity 20 of the valve body 12. A suitable tool may be used to align and compress the assembly 22 as it is inserted into the valve body. The gland 34 and the load members 36 are either installed with the packing 32 prior to installation of the valve element assembly into the valve body 12 or may be installed after the valve element assembly is installed in the valve body. The packing bolt 38 is then screwed into the valve body stem extension 12a to complete the assembly. The bolt 38 is tightened to a suitable torque or number of turns to effect the desired load on the packing 32.

Figure 3:
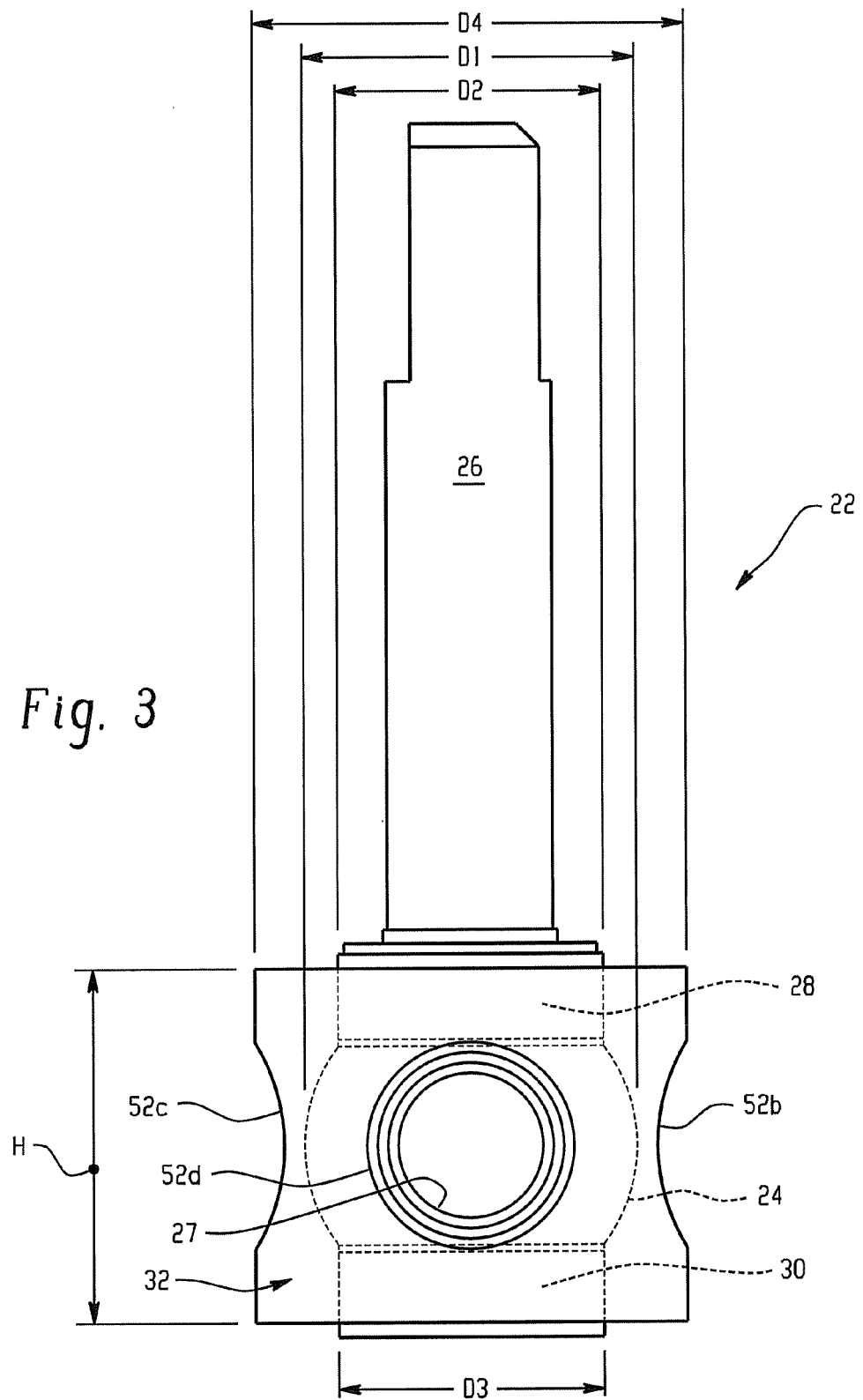
FIG. 3 illustrates a valve element in accordance with the invention in elevation.

In accordance with another aspect of the invention, reducing the packing volume or amount of material that comprises the single piece packing, can be realized by reducing the packing height ("H" in FIG. 3) to the packing outside diameter D4 ratio (H/D4). In FIG. 3 the packing height is noted "H". This results in less packing material for the packing 32, in a manner similar to increasing the trunnion to ball diameter ratio described hereinabove. With less packing material needed to adequately seal the valve, there is less adverse effects noted from temperature variations at high and low temperature and thermal cycling. In a typical prior art ball valve the packing height to packing outer diameter ratio was in the range of 0.9 to 1.1 whereas with the present invention the packing height to packing outer diameter ratio is from about 0.75 to about 0.85 with a preferred value of about 0.8. The overall effect of controlling these ratios is that packing volume can be reduced about 15% to about 50% compared to prior art ball valves that use conventional ratios of trunnion diameter to the ball diameter, or packing height to packing outside diameter, thus providing substantially increased thermal performance.

It is important to note that the various ratios described herein may vary depending on the size of the valve. For example, the exemplary ratio ranges for D3/D1 herein are provided for a ball valve element used with a ¼ inch tubing system. In accordance with the invention then, the ratio D2/D1 or D3/D1 are selected so as to facilitate the assembly of the packing onto the valve element at room temperature. Still further, the ratio of H/D4 is selected so as to reduce the packing volume and thereby increase the thermal performance.

The enlarged trunnion concept provides a more efficient live loading of the packing 32 transmitted through to the lower portion of the packing. In a small trunnion design of the prior art, much of the vertical loading is carried by the ball portion 24 of the valve stem. In contrast, the present invention with the enlarged trunnion diameter focuses the live load toward loading the packing and transmitting that load and resulting packing sealing stress to the lower portion of the packing, thereby providing a much more evenly distributed and effective loading stress to maintain a seal.

We have discovered that in some situations the support rings 42, 44 can crush vertically either from thermal expansion or excessive loads applied during assembly after, for example, packing servicing. Improved resistance to vertical crushing is realized in accordance with the invention by providing the vertical flats 62 to the inside diameter of the support rings 42, 44. The flats should be vertically aligned with the centerline (X axis in the drawings) of the valve 10. These flats may also function as orientation guides to assure proper orientation of the rings during installation. A recessed groove or other suitable marking 63 may be used on the disks 60 to assure proper orientation of the disks 60.

To prevent clipping of the packing material by the edge of the stem orifices 27a and 27b during valve actuation (ball rotation), preferably but not necessarily, an edge break is provided around each of the stem orifices 27a, 27b.

In accordance with another aspect of the invention, it will be noted that the stem 26 and integral ball 24 are axially (along the X axis) unconstrained by use of the live load disk springs 36 and the lower counterbore 40. The stem 26 thus is free to shift under temperature variations that cause expansion and contraction of the packing 32. This helps maintain a consistent and effective load on the packing 32.

FIG. 5 illustrates another embodiment of a valve 68 that incorporates the present invention. In this example, a bottom port (not shown) is formed in the ball 24 that is in fluid communication with a third fitting 70. The other elements of the valve may be the same as in the above described embodiments.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

We claim:

1. A method for assembling a valve comprising the steps of:
preforming a one piece packing;
assembling the one piece packing onto a valve element prior to assembling the valve element into a valve body, wherein the valve element comprises a ball and adjacent upper and lower trunnions, said ball having an outer diameter D1 and at least one of said trunnions having an outer diameter D3, wherein said valve element has a ratio D3/D1 of 0.7 to 0.9, wherein the lower trunnion extends past a lowermost end of said packing;
installing the packing and valve element in a valve cavity of the valve body such that the packing seals against the valve body and the valve element with a lower end of said single piece packing sealing directly against the lower trunnion.

2. The method of claim 1 wherein the one piece packing is preformed from a material selected from the group consisting of perfluoroalkoxy (PFA), ulta-high molecular weight polyethylene, polytetrafluoroethylene (PTFE), variants of PTFE, polyetheretherketone (PEEK), filled PFA, and fluorinated ethylene propylene.

3. The method of claim 1 wherein there is an axial gap between an end surface of the lower trunnion and the valve body upon installation of the packing and valve element in the valve cavity.

4. The method of claim 1 wherein the ball is spherical and the trunnions are cylindrical.

5. The method of claim 4 wherein the one piece packing is preformed with a packing interior surface that conforms to the ball and upper and lower trunnions.

6. The method of claim 1 further comprising roughening the valve cavity prior to installing the packing and valve element in the valve cavity.

7. The method of claim 1 further comprising assembling a plurality of load applying members in the valve body and compressing the load applying members to effect a load on the packing.

8. The method of claim 1 further comprising providing a packing gland adjacent an upper surface of the packing, stacking a plurality of disk springs on the gland, and compressing the disk springs to effect a load on the packing.

9. A method for assembling a valve comprising the steps of:
preforming a one piece packing made from a material selected from the group consisting of perfluoroalkoxy (PFA), ulta-high molecular weight polyethylene, polytetrafluoroethylene (PTFE), variants of PTFE, polyetheretherketone (PEEK), filled PFA, and fluorinated ethylene propylene;
press fit assembling the one piece packing onto a valve element prior to assembling the valve element into a valve body, wherein the valve element comprises a ball and adjacent upper and lower trunnions, said ball having an outer diameter D1 and at least one of said trunnions having an outer diameter D3, wherein said valve element has a ratio D3/D1 of 0.7 to 0.9, wherein the lower trunnion extends past a lowermost end of said packing;
installing the packing and valve element in a valve cavity of the valve body such that the packing seals against the valve body and the valve element with a lower end of said single piece packing sealing directly against the lower trunnion.

10. The method of claim 9 wherein the ball is spherical and the trunnions are cylindrical.

11. The method of claim 10 wherein the one piece packing is preformed with a packing interior surface that conforms to the ball and upper and lower trunnions.

12. The method of claim 9 further comprising roughening the valve cavity prior to installing the packing and valve element in the valve cavity.

13. The method of claim 9 further comprising assembling a plurality of load applying members in the valve body and compressing the load applying members to effect a load on the packing.

14. The method of claim 9 further comprising providing a packing gland adjacent an upper surface of the packing, stacking a plurality of disk springs on the gland, and compressing the disk springs to effect a load on the packing.

15. The method of claim 9 wherein there is an axial gap between an end surface of the lower trunnion and the valve body upon installation of the packing and valve element in the valve cavity.

16. A method for assembling a valve comprising the steps of:
- preforming a one piece packing made from a material selected from the group consisting of perfluoroalkoxy (PFA), ulta-high molecular weight polyethylene, polytetrafluoroethylene (PTFE), variants of PTFE, polyetheretherketone (PEEK), filled PFA, and fluorinated ethylene propylene;
- press fit assembling the one piece packing onto a valve element prior to assembling the valve element into a valve body, wherein the valve element comprises a spherical ball and adjacent upper and lower cylindrical trunnions, said ball having an outer diameter D1 and at least one of said trunnions having an outer diameter D3, wherein said valve element has a ratio D3/D1 of 0.7 to 0.9, wherein the one piece packing is preformed with a packing interior surface that conforms to the ball and upper and lower trunnions, wherein the lower trunnion extends past a lowermost end of said packing;
- installing the packing and valve element in a valve cavity of the valve body such that the packing seals against the valve body and the valve element with a lower end of said single piece packing sealing directly against the lower trunnion;
- assembling a plurality of load applying members in the valve body;
- compressing the load applying members to effect a load on the packing;
- wherein there is an axial gap between an end surface of the lower trunnion and the value body when said load applying members are compressed.

17. The method of claim 16 further comprising roughening the valve cavity prior to installing the packing and valve element in the valve cavity.

18. The method of claim 16 wherein the load applying members comprise disk springs.

19. The method of claim 18 further comprising providing a packing gland adjacent an upper surface of the packing, and stacking said disk springs on the gland.

\* \* \* \* \*